United States Patent
Aradhye et al.

(10) Patent No.: US 8,396,286 B1
(45) Date of Patent: Mar. 12, 2013

(54) LEARNING CONCEPTS FOR VIDEO ANNOTATION

(75) Inventors: Hrishikesh Aradhye, Santa Clara, CA (US); George Toderici, Mountain View, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 12/822,727

(22) Filed: Jun. 24, 2010

Related U.S. Application Data

(60) Provisional application No. 61/220,530, filed on Jun. 25, 2009.

(51) Int. Cl.
G06K 9/62 (2006.01)
G06K 9/66 (2006.01)
G06K 9/00 (2006.01)

(52) U.S. Cl. .................................... 382/159; 382/190

(58) Field of Classification Search .................. 382/156, 382/157, 159, 170, 173, 190, 224–227, 289; 345/420–426; 706/20; 707/1, 104.1, E17.001
See application file for complete search history.

(56) References Cited

U.S. PATENT DOCUMENTS

| | | | |
|---|---|---|---|
| 5,754,681 A * | 5/1998 | Watanabe et al. ............... | 382/159 |
| 5,930,392 A * | 7/1999 | Ho ................................. | 382/224 |
| 6,915,025 B2 * | 7/2005 | Wang et al. ..................... | 382/289 |
| 7,024,033 B2 * | 4/2006 | Li et al. .......................... | 382/159 |
| 7,107,520 B2 | 9/2006 | Gargi | |
| 7,519,217 B2 * | 4/2009 | Liu et al. ........................ | 382/159 |
| 7,609,893 B2 * | 10/2009 | Luo et al. ....................... | 382/224 |
| 8,015,132 B2 * | 9/2011 | Xu .................................. | 706/20 |
| 2009/0208106 A1 * | 8/2009 | Dunlop et al. ................. | 382/173 |
| 2009/0234886 A1 * | 9/2009 | Raghavan .................. | 707/104.1 |
| 2009/0292685 A1 | 11/2009 | Liu et al. | |
| 2010/0220922 A1 * | 9/2010 | Okada ........................... | 382/159 |

OTHER PUBLICATIONS

Cao, L., et al., "Annotating Photo Collections by Label Propagation According to Multiple Similarity Cues," Proceeding of the 16th ACM international conference on Multimedia, 2008, 9 pages.
Carvalho, R., "Metadata goes where Metadata is: contextual networks in the photographic domain," ESWC 2008 Ph. D. Symposium, 2008, 5 pages.
Chang, S., et al., "Recent Advances and Challenges of Semantic Image/Video," IEEE International Conference on Acoustics, Speech and Signal Processing, 2007, 4 pages.
Rodriguez, M., et al., "Automatic Metadata Generation Using Associative Networks," ACM Transactions on Information Systems, Feb. 2009, pp. 7:1-7:20, vol. 27, No. 2, Article 7.
Agarwal, N., et al., "Blocking Objectionable Web Content by Leveraging Multiple Information Sources," SIGKDD Explor. Newsl., 2006, vol. 8, No. 1, pp. 17-26.

(Continued)

*Primary Examiner* — Amir Alavi
(74) *Attorney, Agent, or Firm* — Fenwick & West LLP

(57) ABSTRACT

A concept learning module trains video classifiers associated with a stored set of concepts derived from textual metadata of a plurality of videos, the training based on features extracted from training videos. Each of the video classifiers can then be applied to a given video to obtain a score indicating whether or not the video is representative of the concept associated with the classifier. The learning process does not require any concepts to be known a priori, nor does it require a training set of videos having training labels manually applied by human experts. Rather, in one embodiment the learning is based solely upon the content of the videos themselves and on whatever metadata was provided along with the video, e.g., on possibly sparse and/or inaccurate textual metadata specified by a user of a video hosting service who submitted the video.

20 Claims, 6 Drawing Sheets

OTHER PUBLICATIONS

Ayad, H.G., et al., Cumulative Voting Consensus Method for Partitions with Variable Number of Clusters, IEEE Transactions on Pattern Analysis and Machine Intelligence, Jan. 2008, vol. 30, No. 1, pp. 160-173.

Ayad, H.G., et al., "On Voting-Based Consensus of Cluster Ensembles," Pattern Recognition, May 2010, vol. 43, No. 5, pp. 1943-1953.

Baluja, S., et al., "Video Suggestion and Discovery for YouTube: Taking Random Walks Through the View Graph," Proceedings of the International World Wide Web Conference, 2008, 10 pages.

Barnard, K., et al., "Matching Words and Pictures," Journal of Machine Learning Research, 2003, vol. 3, pp. 1107-1135.

Belkin, M., et al., "Manifold Regularization: A Geometric Framework for Learning from Labeled and Unlabeled Examples," Journal of Machine Learning Research, 2006, vol. 7, pp. 2399-2434.

Blei, D., et al., "Modeling Annotated Data," Proc. ACM SIGIR, 2003, pp. 127-134.

Blum, A., et al., "Combining Labeled and Unlabeled Data with Co-Training," COLT: Proceedings of the Workshop on Computational Learning Theory, Morgan Kaufmann Publishers, 1998.

Boureau, Y.L., et al., "Learning Mid-Level Features for Recognition," Conference on Computer Vision and Pattern Recognition, 2010, pp. 2559-2566.

Brubaker, S. C., et al., "On the Design of Cascades of Boosted Ensembles for Face Detection," International Journal of Computer Vision (IJCV), May 2008, vol. 77, No. 1-3, pp. 65-86.

Brubaker, S. C., et al., "Towards Optimal Training of Cascaded Detectors," Computer Vision—ECCV, Lecture Notes in Computer Science, 2006, vol. 3951/2006, pp. 325-337.

Brubaker, S. C., et al., "Towards the Optimal Training of Cascades of Boosted Ensembles," Toward Category-Level Object Recognition (CLOR), Lecture Notes in Computer Science, 2006, vol. 4170/2006, pp. 301-320.

Cao, X., et al., "Video Shot Motion Characterization Based on Hierarchical Overlapped Growing Neural Gas Networks," Multimedia Systems, Springer-Verlag 2003, School of Electrical and Electronic Engineering, Nanyang Technological University, Nanyang Avenue, Singapore, 639798, pp. 1-8.

Chang, C.-C., et al., "Liblinear: A Library for Large Linear Classification," 2010, [online] [Retrieved on Jan. 17, 2011], Software available at <http://www.csie.ntu.edu.tw/~cjlin/liblinear/>.

Chang, E., et al., "A Unified Learning Paradigm for Large-Scale Personalized Information Management," Proceedings of the Emerging Information Technology Conference, 2005.

Chou, Y.Y., et al., "A Hierarchical Multiple Classifier Learning Algorithm," Proceedings of the 15th International Conference on Pattern Recognition—ICPR 2000, vol. II, pp. 152-155.

Christoudias, C. M., et al., Co-Training with Noisy Perceptual Observations, CVPR, 2009, pp. 1-10.

Cilibrasi, R. L., et al., "A Fast Quartet Tree Heuristic for Hierarchical Clustering," Pattern Recognition, Mar. 2011, vol. 44, No. 3, pp. 662-677.

Concepcióon Morales, E.R., et al., "Building and Assessing a Constrained Clustering Hierarchical Algorithm," Proceedings of the 13th Iberoamerican Congress on Pattern Recognition, CIARP 2008, Sep. 9-12, 2008, pp. 211-218.

Cordella, L. P., et al., "Combining Single Class Features for Improving Performance of a Two Stage Classifier," Proceedings of the 2010 International Conference on Pattern Recognition, Aug. 23-26, 2010, pp. 4352-4355.

Cour, T., et al., "Learning from Ambiguously Labeled Images," Technical Report, U. Penn., 2009, pp. 1-8.

Day, M., et al., "Constructing Efficient Cascade Classifiers for Object Detection," Proceedings of 2010 IEEE 17th International Conference on Image Processing, Hong Kong, Sep. 26-29, 2010, pp. 3781-3784.

Dekel, O., et al., "Large Margin Hierarchical Classification," ICML, 2004, 8 pages.

Deng, J., et al., "ImageNet: A Large-Scale Hierarchical Image Database," *CVPR09*, 2009, 8 pages.

Duan, L., et al., "Domain Transfer SVM for Video Concept Detection," Proceedings of IEEE Conference on Computer Vision and Pattern Recognition (CVPR), 2009, pp. 1375-1381.

Duchenne, O., et al., "Automatic Annotation of Human Actions in Video," ICCV, 2009, 8 pages.

Dundar, M. M., et al., "Joint Optimization of Cascaded Classifiers for Computer Aided Detection," CVPR07, pp. 1-8.

Duygulu, P., et al., "Object Recognition as Machine Translation: Learning a Lexicon for a XED Image Vocabulary," Computer Vision—ECCV 2002, Proceedings of the 7th European Conference on Computer Vision, Copenhagen, Denmark, May 28-31, 2002, Part IV, pp. 97-112.

El-Sherif, E., et al., "Automatic Generation of Optimum Classification Cascades," International Conference on Pattern Recognition (ICPR), 2008, pp. 1-4.

El-Shishini, H., et al., "A Multistage Algorithm for Fast Classification of Patterns," Pattern Recognition Letters, Oct. 1989, vol. 10, No. 4, pp. 211-215.

Everingham, M., et al., "Hello! My Name is . . . Buffy—Automatic Naming of Characters in TV Video," BMVC, 2006, 10 pages.

Ewerth, R., et al., "Semi-Supervised Learning for Semantic Video Retrieval," Proceedings of the Conference on Image and Video Retrieval (CIVR), Amsterdam, The Netherlands, Jul. 9-11, 2007, pp. 154-161.

Fan, J., et al., "Incorporating Concept Ontology for Hierarchical Video Classification, Annotation, and Visualization," IEEE Transactions on Multimedia, Aug. 2007, vol. 9, No. 5, pp. 939-957.

Fan, R.-E., et al., "Liblinear: A library for large linear classification," Journal of Machine Learning Research, 2008, vol. 9, pp. 1871-1874.

Feng, H., et al., "A Bootstrapping Framework for Annotating and Retrieving WWW Images," Proc. ACM MM, 2004, 8 pages.

Feng, S. L., et al., "Multiple Bernoulli Relevance Models for Image and Video Annotation," Proc. CVPR, 2004, pp. 1-8.

Fergus, R., et al., "A Visual Category Filter for Google Images," ECCV, 2004.

Fergus, R., et al., "Learning Object Categories from Google's Image Search," Proceedings of the 10th IEEE International Conference on Computer Vision (ICCV), 2005, vol. 2, pp. 1816-1823.

Foo, B., et al., "A Distributed Approach for Optimizing Cascaded Classifier Topologies in Real-Time Stream Mining Systems," IEEE Transactions on Image Processing, Nov. 2010, vol. 19, No. 11, pp. 3035-3048.

Freund, Y., et al., "A Decision-Theoretic Generalization of On-Line Learning and an Application to Boosting," Journal of Computer and System Sciences, Aug. 1997, vol. 55, No. 1, pp. 119-139.

Freund, Y., et al., "A Decision-Theoretic Generalization of On-Line Learning and an Application to Boosting," Proceedings of European Conference on Computational Learning Theory (ECCV), Barcelona, Spain, Mar. 13-15, 1995, pp. 23-37.

Giusti, N., et al., "Theoretical and Experimental Analysis of a Two-Stage System for Classification," IEEE Transactions on Pattern Analysis and Machine Intelligence (PAMI), Jul. 2002, vol. 24, No. 7, pp. 893-904.

Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.

Hays, J., et al., "IM2GPS: Estimating Geographic Information from a Single Image," Proceedings of the IEEE Conference on Computer Vision and Pattern Recognition (CVPR), 2008.

Heiseleyz, B., et al., "Feature Reduction and Hierarchy of Classifiers for Fast Object Detection in Video Images," Proceedings of the 2001 IEEE Computer Society Conference on Computer Vision and Pattern Recognition (CVPR01), Kauai, Hawaii, Dec. 8-14, 2001, vol. II, pp. 18-24.

Hore, P., et al., "A Scalable Framework for Cluster Ensembles," Pattern Recognition, May 2009, vol. 42, No. 5, pp. 676-688.

Ikizler-Cinbis, N., et al., "Learning Actions from the Web," Proceedings of 12th International Conference on Computer Vision (ICCV), 2009, 8 pages.

Jones, M. J., et al., "Statistical Color Models with Application to Skin Detection," International Journal of Computer Vision (IJCV), Jan. 2002, vol. 46, No. 1, pp. 81-96.

Jordan, M.I., et al., "Hierarchical Mixture of Experts and the EM Algorithm," Neural Computation, 1994, vol. 6, pp. 181-214.

Kalogerakis, E., et al., "Image Sequence Geolocation with Human Travel Priors," Proceedings of the IEEE International Conference on Computer Vision (ICCV'09), 2009, 8 pages.

Kavukcuoglu, K., et al., "Learning Invariant Features Through Topographic Filter Maps," CVPR09, pp. 1605-1612.

Kukenys, I., et al., "Classifier Cascades for Support Vector Machines," 2008 $23^{rd}$ International Conference Image and Vision Computing New Zealand (IVCNZ08), Nov. 26-28, 2008, pp. 1-6.

Kumar, S., et al., "Discriminative Fields for Modeling Spatial Dependencies in Natural Images," Advances in Neural Information Processing Systems (NIPS), 2004, 8 pages.

Lafferty, J., et al., "Conditional Random Fields: Probabilistic Models for Segmenting and Labeling Sequence Data," Proceedings of International Conference on Machine Learning (ICML), 2001, 8 pages.

Laptev, I., et al., "Learning Realistic Human Actions from Movies," Proceedings of the IEEE Conference on Computer Vision and Pattern Recognition (CVPR), 2008, 8 pages.

Leung, T., et al., "Representing and Recognizing the Visual Appearance of Materials Using Three-Dimensional Textons," International Journal of Computer Vision (IJCV), 2001, vol. 43, No. 1, pp. 29-44.

Li, L., et al., "Optimol: Automatic Online Picture Collection Via Incremental Model Learning," Proc. Computer Vision and Pattern Recognition (CVPR), 2007.

Li, Y., et al., "Bagging Based Efficient Kernel Fisher Discriminant Analysis for Face Recognition," The $18^{th}$ International Conference on Pattern Recognition (ICPR06), vol. 3, pp. 523-526.

Liu, J., "Recognizing Realistic Actions from Videos "in the Wild"," Computer Vision and Pattern Recognition (CVPR), 2009, 1996-2003.

Liu, T.-Y., et al., "Support Vector Machines Classification with a Very Large-Scale Taxonomy," SIGKDD Explorations, 2005, vol. 1, pp. 36-43.

Lopez-Maury, L., "A Two-Component Signal Transduction System Involved in Nickel Sensing in the Cyanobacterium *Synechocystis sp.* PCC 6803," Molecular Microbiology, 2002, vol. 43, No. 1, pp. 247-256.

Lowe, D. G., "Distinctive Image Features from Scale-Invariant Keypoints," International Journal of Computer Vision (IJCV), 2004, vol. 60, No. 2, pp. 91-110.

Luo, H., "Optimization Design of Cascaded Classifiers," CVPR05, vol. 1, pp. 480-485.

Ma, B. P., et al., "Discriminant Analysis for Perceptionally Comparable Classes," FG08, pp. 1-6.

Mangai, U. G., et al., "A Hierarchical Multi-Classifier Framework for Landform Segmentation Using Multi-Spectral Satellite Images—A Case Study Over the Indian Subcontinent," 2010 Fourth Pacific-Rim Symposium on Image and Video Technology, (PSIVT10), Nov. 14-17, 2010, Singapore, pp. 306-313.

Mirzaei, A., et al., "Combining Hierarchical Clusterings Using Min-Transitive Closure," ICPR08, pp. 1-4.

Montagnuuolo, M., et al., "Parallel Neural Networks for Multimodal Video Genre Classification," Multimedia Tools and Applications, Jan. 2009, vol. 41, pp. 125-159.

Nam, M. Y., et al., "Cascade of Fusion for Adaptive Classifier Combination Using Context-Awareness," AMDO06, pp. 252-261.

Neapolitan, R. E., "Learning Bayesian Networks," Prentice Hall, Upper Saddle River, NJ, USA, 2003.

Neven, H., et al., "Image Recognition with an Adiabatic Quantum Computer I. Mapping to Quadratic Unconstrained Binary Optimization," 2008, pp. 107.

Nister, D., et al., "Scalable Recognition with a Vocabulary Tree," CVPR '06: Proceedings of the 2006 IEEE Computer Society Conference on Computer Vision and Pattern Recognition, IEEE Computer Society, Washington, DC, USA, Jun. 2006, vol. 2, pp. 2161-2168.

"OpenDirectoryProject," 1998-2010, [online] [Retrieved on Jan. 16, 2011] Retrieved from the internet <URL:http://www.dmoz.org/>.

Patterson, R. D., et al., "Complex Sounds and Auditory Images," Proc. Auditory Physiology and Perception, 1992, pp. 429-446.

Qi, G.-J., et al., "Correlative Multilabel Video Annotation with Temporal Kernels," ACM Transactions on Multimedia Computing, Communications, and Applications, 2008, vol. 5, No. 1, Article 3, pp. 1-27.

Quost, B., et al., "Pairwise Classifier Combination Using Belief Functions," Pattern Recognition Letters (PRL), Apr. 1, 2007, vol. 28, No. 5, pp. 644-653.

Raina, R., et al., "Self-Taught Learning: Transfer Learning from Unlabeled Data," Proceeding of International Conference on Machine Learning (ICML), Corvallis, OR, 2007, pp. 759-166.

Ramachandran, C., et al., "VideoMule: A Consensus Learning Approach to Multi-Label Classification from Noisy User-Generated Videos," ACM Multimedia, 2009, 4 pages.

Ranzato, M., et al., "Modeling Pixel Means and Covariances using Factorized Third-Order Boltzmann Machines," Proceedings of the IEEE Conference on Computer Vision and Pattern Recognition (CVPR10), 2010, pp. 2551-2558.

Ranzato, M., et al., "Unsupervised Learning of Invariant Feature Hierarchies with Applications to Object Recognition," CVPR07, pp. 1-8.

Rehn, M., et al., "Sound Ranking Using Auditory Sparse-Code Representations," Proc. ICML: Workshop on Sparse Methods for Music Audio, 2009, 3 pages.

Rodriguez, J. J., "Forests of Nested Dichotomies," Pattern Recognition Letters (PRL), Jan. 15, 2010, vol. 31, No. 2, pp. 125-132.

Sargin, E. M., et al., "Audiovisual Celebrity Recognition in Unconstrained Web Videos," Proc. ICASSP, 2009, 4 pages.

Schapire, R. E., "The Boosting Approach to Machine Learning: An Overview," MSRI Workshop on Nonlinear Estimation and Classification, 2002, pp. 1-23.

Schapire, R. E., et al., "Boosting the Margin: A New Explanation for the Effectiveness of Voting Methods," The Annals of Statistics, 1998, vol. 26, No. 5, pp. 1651-1686.

Schindler, G., et al., "Internet Video Category Recognition," First IEEE Workshop on Internet Vision, CVPR, 2008, 7 pages.

Serdyukov, P., et al., "Placing Flickr Photos on a Map," SIGIR'09: Proceedings of the $32^{nd}$ International ACM SIGIR Conference on Research and Development in Information Retrieval, 2009, New York, NY, USA, pp. 484-491.

Singh, R., et al., "Reduced-Complexity Delayed-Decision Algorithm for Context-Based Image Processing Systems," IEEE Transaction on Image Processing, Aug. 2007, vol. 16, No. 8, pp. 1937-1945.

Slonim, N., et al., "Discriminative Feature Selection via Multiclass Variable Memory Markov Model," Proceedings of the Nineteenth International Conference on Machine Learning, 2002, 8 pages.

Smeaton, A. F., et al., "Evaluation Campaigns and TRECVid," Proceedings of the $8^{th}$ ACM International Workshop on Multimedia Information Retrieval, ACM Press, Oct. 26-27, 2006, pp. 321-330.

Snoek, C., et al., "The MediaMill TRECVid 2008 Semantic Video Search Engine," 2009, 14 pages.

Snoek, C. G.M., et al., "Early Versus Late Fusion in Semantic Video Analysis," ACM Multimedia 2005, Nov. 6-11, 2005, Singapore, 4 pages.

Song, Y., et al., "Taxonomic Classification for Web-Based Videos," Conference on Computer Vision and Pattern Recognition (CVPR), 2010.

Su, Y., et al., "Hierarchical Ensemble of Global and Local Classifiers for Face Recognition," IP, Aug. 2009, vol. 18, No. 8, pp. 1885-1896.

Sun, A., et al., Hierarchical Text Classification and Evaluation, Proceedings of the 2001 IEEE International Conference on Data Mining (ICDM), Nov. 2001, pp. 521-528.

Sun F., et al., "Two-Stage Computational Cost Reduction Algorithm Based on Mahalanobis Distance Approximations," ICPR00, vol. II, pp. 696-699.

Szczot, M., et al., "Package Boosting for Readaption of Cascaded Classifiers," 2010 International Conference on Pattern Recognition (ICPR10), pp. 552-555.

Tola, E., et al., "A Fast Local Descriptor for Dense Matching," Proceedings of IEEE Conference on Computer Vision and Pattern Recognition (CVPR), 2008, Alaska, USA, pp. 1-15.

Van Laere, O., et al., "Towards Automated Georeferencing of Flickr Photos," GIR'10: Proceedings of the 6th Workshop on Geographic Information Retrieval, Feb. 18-19, 2010, pp. 1-7.

Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.

Visentini, I., et al., "Cascaded Online Boosting," Journal of Real-Time Image Processing, Dec. 2010, vol. 5, No. 4, pp. 245-257.

Visentini, I, et al., "On-Line Boosted Cascade for Object Detection," ICPR08, pp. 1-4.

Vuurpijl, L., et al., "An Overview and Comparison of Voting Methods for Pattern Recognition," Proceedings of the Eighth International Workshop on Frontiers in Handwriting Recognition (IWFHR02), 2002, pp. 195-200.

Vuurpijl, L., et al., "Architectures for Detecting and Solving Conflicts: Two-Stage Classification and Support Vector Classifiers," International Journal on Document Analysis and Recognition (IJDAR), Jul. 2003, vol. 5, No. 4, pp. 213-223.

Wang, P., et al., "Training a Multi-Exit Cascade with Linear Asymmetric Classification for Efficient Object Detection," Proceedings of 2010 IEEE 17th International Conference on Image Processing (ICIP10), Hong Kong, Sep. 26-29, 2010, pp. 61-64.

Wu, D., et al., "A Min-Max Framework of Cascaded Classifier with Multiple Instance Learning for Computer Aided Diagnosis," Proceedings of IEEE Computer Society Conference on Computer Vision and Pattern Recognition (CVPR09), 2009, pp. 1359-1366.

Wu D., et al., "Resilient Subclass Discriminant Analysis," ICCV09, pp. 389-396.

Wu, J. X., et al., "Fast Asymmetric Learning for Cascade Face Detection," IEEE Transactions on Pattern Analysis and Machine Intelligence (PAMI), Mar. 2008, vol. 30, No. 3, pp. 369-382.

Wu, X., et al., "Incorporating Prior Knowledge with Weighted Margin Support Vector Machines," Proceedings of the International Conference on Knowledge Discovery and Data Mining (SIGKDD), 2004, pp. 326-333.

Yagnik, J., et al., "Learning People Annotation from the Web Via Consistency Learning," Proc. Workshop on MIR, Augsburg, Bavaria, Germany, Sep. 28-29, 2007, pp. 285-290.

Yan, S.Y., et al., "Matrix-Structural Learning (MSL) of Cascaded Classifier from Enormous Training Set," Computer Vision and Pattern Recognition (CVPR07), 2007, pp. 1-7.

Yanai, K., et al., "Probabilistic Web Image Gathering," Proc. ACM SIGMM Workshop on MIR, 2005, pp. 57-64.

Yang, J., et al., "Cross-Domain Video Concept Detection Using Adaptive SVMS," Proceedings of the 15th International Conference on Multimedia, Sep. 2007, Augsburg, Bavaria, Germany, 10 pages.

Yang, L., et al., "Multi-Modality Web Video Categorization," Proc. MIR, 2007, ACM Press, pp. 265-274.

"YouTube—Broadcast Yourself," 2011, [online] [Retrieved on Jan. 16, 2011] Retrieved from the internet <URL:http://www.youtube.com>.

Zanetti, S., et al., "A Walk Through the Web's Video Clips," First IEEE Workshop on Internet Vision, Computer Vision and Pattern Recognition (CVPR08), 2008, 8 pages.

Zhang, B.C., et al., "Discriminant Analysis Based on Kernelized Decision Boundary for Face Recognition," AVBPA05, LNCS 3546, 2005, pp. 966.

Zhang, H., et al., "Automatic Partitioning of Full-Motion Video," Multimedia Systems, 1993, vol. 1, No. 1, pp. 10-28.

Zhang, X.Q., "Clustering by Evidence Accumulation on Affinity Propagation," ICPR08, 2008, pp. 1-4.

Zhao, M., et al., "Large Scale Learning and Recognition of Faces in Web Videos," Proceedings of the 8th IEEE International Conference on Automatic Face and Gesture Recognition, 2008, 7 pages.

Zhao, R., et al., "Narrowing the Semantic Gap—Improved Text-Based Web Document Retrieval Using Visual Features," IEEE Transactions on Multimedia, Jun. 2002, vol. 4, No. 2, pp. 189-200.

Zheng, Y.-T., et. al, "Tour the World: Building a Web-Scale Landmark Recognition Engine", Proceedings of the International Conference on Computer Vision and Pattern Recognition, Jun. 2009, Miami, Florida, U.S.A., pp. 1-8.

Zhu, X., et al., "Learning from Labeled and Unlabeled Data with Label Propagation," CMU CALD Tech Report CMU-CALD-02-107, 19 pages.

Zhu, X., "Semi-Supervised Learning Literature Survey," Computer Sciences Technical Report 1530, University of Wisconsin-Madison, 2005, pp. 1-38.

Aradhye, H., et al., "Video2Text: Learning to annotate video content," IEEE International Conference on Data Mining Workshops, Dec. 6, 2009, pp. 144-151.

Cai, C., et al., "Hierarchical clustering of WWW image search results using visual, textual and link information," In Proc. of ACM MM'04, Oct. 10-16, 2004, pp. 952-959.

Cui, F., et al., "Content-enriched classifier for web video classification," In Proc. of SIGIR'10, Jul. 19-23, 2010, pp. 619-626.

Fischer, S., et al., Automatic recognition of film genres, In Proc. of ACM Multimedia'95, Nov. 5-9, 1995, pp. 295-304.

Hall, K., et al., "MapReduce/Bigtable for distributed optimization," in NIPS 2010 Workshop on Learning on Cores, Clusters and Clouds, 2010, pp. 1-7.

Huang, G., et al., Text-based video content classification for online video- sharing sites. Journal of the American Society for Information Science and Technology, 2010, vol. 61, No. 5, pp. 891-906.

Lin, A., et al., "News video classification using SVM-based multimodal classifiers and combination strategies," In Proc. of ACM Multimedia'02, Dec. 1-6, 2002, pp. 323-326.

Toderici, H., et al., "Finding meaning on YouTube: Tag recommendation and category discovery," In Proc. of IEEE CVPR-10, 2010, 8 pages.

Zhang, D., et al., "Joint categorization of queries and clips for web-based video search," In Proc. of MIR'06, Oct. 26-27, 2006, pp. 193-202.

* cited by examiner

LEARNING CONCEPTS FOR VIDEO ANNOTATION

CROSS REFERENCE TO RELATED APPLICATIONS

The application claims the benefit of U.S. Provisional Application No. 61/220,530, filed on Jun. 25, 2009, which is hereby incorporated by reference.

BACKGROUND

1. Field of Art

The present invention generally relates to the field of digital video, and more specifically, to methods of labeling videos with concepts that they represent.

2. Background of the Invention

Concept labeling of a digital video associates the video with an indicator of a concept that the video or a portion thereof represents, such as "cartoon" or "nature." Automatic concept labeling of videos stored by video hosting services like GOOGLE VIDEO or YOUTUBE is of great benefit to users of such systems, permitting the users to more effectively determine whether the video would be of interest to them by examining or otherwise using the video's concept labels.

Generally, existing automatic concept labeling approaches require a predefined set of concepts specified by a human expert such as a hierarchical taxonomy of predefined concepts. Using a supervised learning model, the human expert labels selected videos with the concepts, and provides those labeled videos to the system, which then learns the relationships between videos (e.g., video content or metadata) and the concepts. In large corpuses (e.g., tens of millions of videos), such a technique will likely not capture the full richness of the concepts illustrated by the videos. For example, a substantial corpus of user-contributed videos can represent a very large and diverse number of distinct concepts, which continues to change as new videos, reflective of new events in the real world, are introduced. Further, given the diversity of concepts in a large corpus, it is more likely that there will be videos that represent concepts that simply would not appear in a manually-specified taxonomy of concepts.

Some conventional techniques for automatic labeling analyze the user-supplied metadata associated with the videos to perform the concept labeling and depend heavily on the accuracy of the metadata to properly label the videos. Unfortunately, the user-supplied metadata is in many cases incomplete or inaccurate. For example, a user submitting a video might make unintentional errors such as misspellings, or might fail to make the effort to provide much or any descriptive textual metadata. A user submitting a video might also intentionally provide false metadata, e.g. as "spam" to induce other users to view the video. Thus, labeling techniques that uncritically accept the user-provided metadata, without employing measures that take the potential inaccuracy into account, frequently produce poor-quality results.

SUMMARY

A concept learning module trains video classifiers associated with a stored set of concepts derived from textual metadata of a plurality of videos, the training based on features extracted from training videos. Each of the video classifiers can then be applied to a given video to obtain a score indicating whether or not the video is representative of the concept associated with the classifier. The learning process begins without the need of any concepts being known a priori, and without a training set of videos having training labels manually applied by human experts. Rather, in one embodiment unsupervised learning is used, and the training is based solely on the content of the videos themselves and on whatever metadata was provided along with the video, e.g., on possibly sparse and/or inaccurate textual metadata specified by a user of a video hosting service who submitted the video.

In one embodiment, the concept learning system first prepares data used during iterative learning, identifying concepts from textual metadata associated with a set of videos, deriving audio-visual features from the videos, and specifying a training set and one or more validation sets of videos for each concept. In the first iteration, the iterative learning process trains a classifier for each concept based on the training set for that concept, and further tests the accuracy of the trained classifier with reference to the concept's validation set. Those classifiers with sufficient accuracy are retained and applied to each of the videos in a video repository; these classifiers are referred to as learned classifiers. The scores resulting from applying the learned classifiers to a video are then added to the features already associated with that video. In the next iteration of learning, the concepts for which the classifiers were not successfully learned are retrained, this time using the additional score features added during the prior iteration. As a result of the additional score features, many of the retrained classifiers will likely become sufficiently accurate and will thus be retained as additional learned classifiers, and their resulting scores will likewise be computed and retained as additional features. The iterative learning proceeds until a terminating condition, such as a maximum number of iterations, or a failure to learn accurate classifiers for a sufficient number of new concepts, is met. The end result is a set of accurate classifiers, one for each of some subset of the concepts, with possibly another subset of the concepts (e.g., overly abstract concepts) lacking accurate classifiers.

The concepts learned by the concept learning system have a number of uses within a video hosting service, such as supplementing any existing metadata about the video with labels of concepts found to be embodied by the video based on the learned classifier. Another use is to verify the accuracy of any existing metadata about the video, e.g., the textual metadata supplied by a user who submitted the video to the video hosting service.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
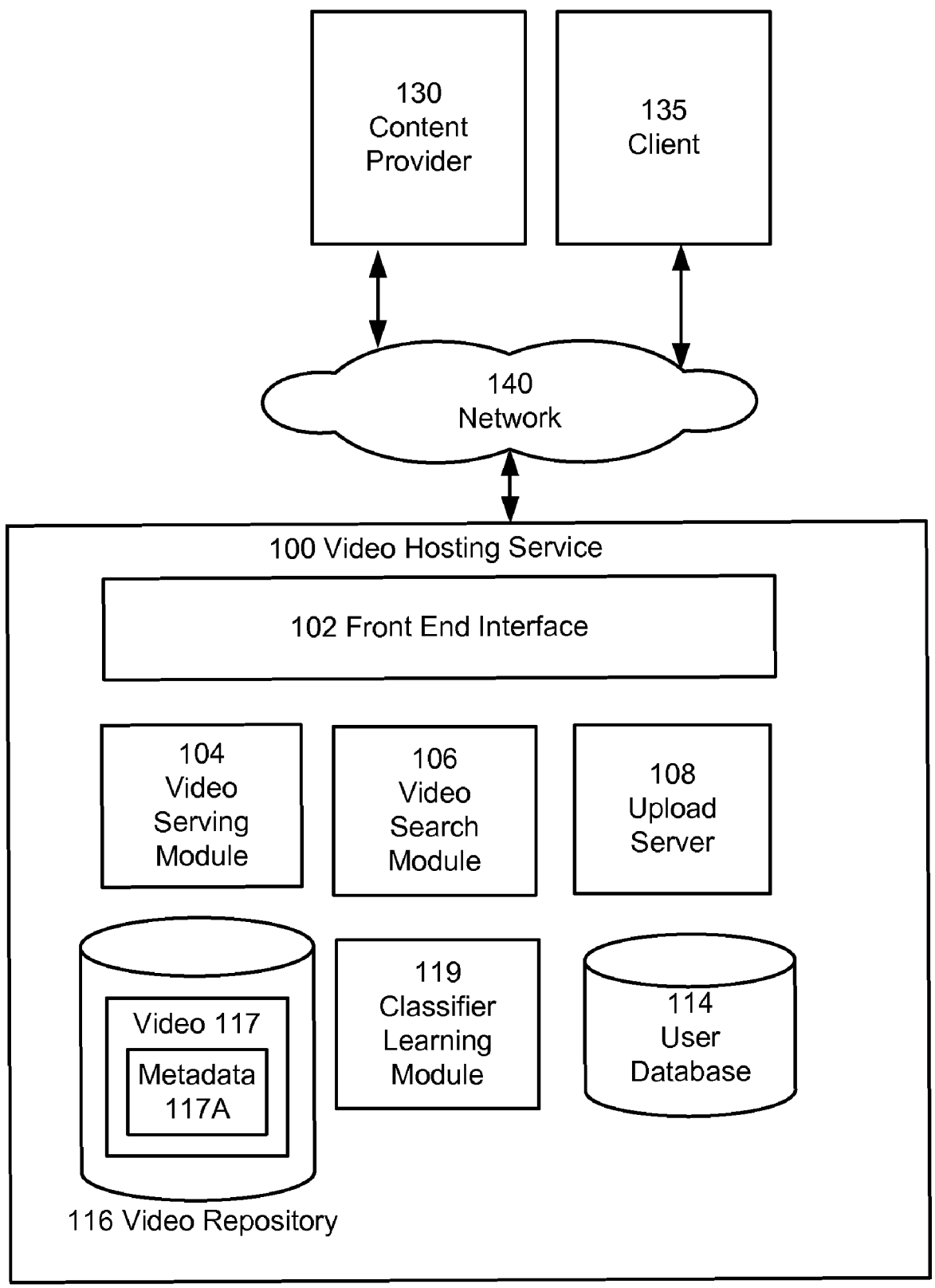
FIG. 1 is a block diagram of a video hosting service in which concept learning can be employed, according to one embodiment.

FIG. 1 is a block diagram of a video hosting service 100 in which concept learning can be employed, according to one embodiment. The video hosting service 100 represents a system such as that of YOUTUBE or GOOGLE VIDEO that stores and provides videos to clients such as the client device 135. The video hosting site 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting site 100. One example of a suitable site 100 is the YOUTUBE website, found at www.youtube.com. Other video hosting sites are known, as well, and can be adapted to operate according to the teachings disclosed herein. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting site 100.

The content provider 130 operates a client device to perform various content provider functions. Content provider functions may include, for example, uploading a video file to the video hosting website 100, editing a video file stored by the video hosting website 100, or editing content provider preferences associated with a video file.

The client 135 operates on a device to view video content stored by the video hosting site 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting website 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting site 100.

In some embodiments, the user database 114 is responsible for maintaining a record of all registered users of the video hosting server 100. Registered users include content providers 130 and/or users who simply view videos on the video hosting website 100. Each content provider 130 and/or individual user registers account information including login name, electronic mail (e-mail) address and password with the video hosting server 100, and is provided with a unique user ID. The user ID can be based on any identifying information, such as the user's IP address, user name, or the like. This account information is stored in the user database 114.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a user who uploaded the video.

The video hosting service 100 further comprises a classifier learning module 119 that trains accurate video classifiers for a set of dynamically discovered concepts. The trained classifiers can then be applied to a given video to determine which of the discovered concepts the video represents. The classifier learning module 119 is now described in greater detail.

Figure 2:
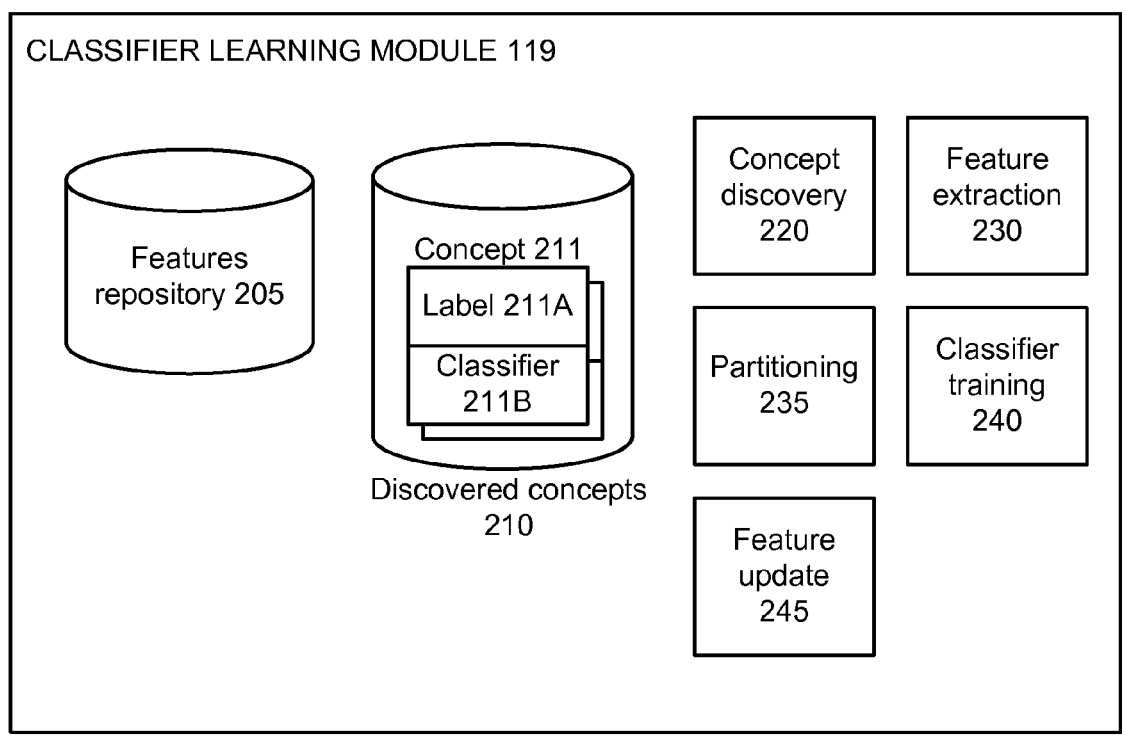
FIG. 2 illustrates the various components of a classifier learning module used in the video hosting service, according to one embodiment.

FIG. 2 illustrates the various components of the classifier learning module 119, according to one embodiment. The classifier learning module 119 comprises various modules to discover concepts, to derive video features, to train classifiers for various ones of the concepts, and the like. In one embodiment, the classifier learning module 119 is incorporated into an existing video hosting service 100, such as YOUTUBE. The various components of the video hosting service 100 are now described in more detail.

The classifier learning module 119 has access to the video repository 116 of the video hosting service 100. The classifier learning module 119 additionally comprises a features repository 205 that stores, for videos of the video repository 116, associated sets of features that characterize the videos with respect to one or more types of information, such as color information. The features of a video 117 are distinct from the raw content of the video itself and are derived from it by a feature extraction module 230 and updated by a feature update module 245, described below. In one embodiment, the features are stored as a vector of values, the vector having the same dimensions for each of the videos 117 for purposes of consistency.

The classifier learning module 119 further comprises a concepts repository 210 that stores the various concepts 211 for which classifiers may be learned. Generally, a concept is a term or phrase that describes some entity, activity, event, place, object, or characteristic that is associated with a video 117. A concept can be associated with a video by having some representation within the video itself, e.g., appearing in the video, or by being present in metadata 117A for the video (e.g., in a user provided description, comments, annotations, or the like). A video can have many different concepts associated with it, but users typically are interested in what may be considered the most salient concept for the video. Each concept has both a label 211A and a learned classifier 211B. The label 211A is a unique name for the concept, and in one embodiment is implemented as text string of N words for some integer N, also referred to as an "n-gram." Some examples of such labels 211A are the strings (or n-grams) "cartoon," "hindi," "telenovela," "naruto shippuden," "english subtitles," "final fantasy," and "music video."

The classifier 211B for a concept 211 is a function that outputs a score representing a degree to which the features associated with the video indicate that the concept is relevant to the video. In one embodiment, the features to which the classifier 211B is applied include both video content features (described below with respect to feature extraction module 230) and scores obtained from classifiers (described below with respect to feature update module 245). The classifier 211B can return different types of scores in different embodiments. For example, in one embodiment the classifier 211B outputs a real number indicating a strength of the relevance match between the video and the concept. In another embodiment, the classifier 211B outputs a Boolean value, e.g., the integer 1 to indicate that the video is relevant to the concept, and a different value, e.g., the integer 0, to indicate that the concept is not relevant.

The classifier learning module 119 also comprises a concept discovery module 220 that identifies potential concepts that can be used to label videos. In one embodiment, the concept discovery module 220 extracts the concepts from the video metadata 117A of the various videos 117 in the video repository 116, or from some subset of the metadata, such as the title and tags but not the (typically lengthier) description. More specifically, the concept discovery module 220 analyzes the metadata 117A of some of all of the videos 117, collecting a large set of n-grams (i.e., strings having at most n word tokens) occurring in the metadata of any of the videos. For example, for an embodiment in which the concept discovery module 220 collects 4-grams, if the metadata for a particular video comprised a title having the text "Informative video about penguins," the concept discovery module would accordingly identify as potential concepts the strings "Informative video about penguins," "Informative video about", "video about penguins," "Informative video," "video about," "about penguins," "Informative," "video," "about," and "penguins." Concepts could be collected in a similar manner from the description, tags, or other user-supplied textual metadata. In one embodiment, in order to speed up subsequent processing the concept discovery module 220 creates a lookup table mapping a concept to the videos that contain that concept within their metadata. The concept discovery module 220 removes a set of predetermined stopwords unlikely to convey substantive meaning, such as articles and prepositions like "a," "the," and "of," from the list of potential concepts.

In an alternate embodiment, the concept discovery module 220 obtains the set of potential concepts from another source, such as a pre-existing set of terms and phrases such as provided by WordNet, rather than extracting them from video metadata 117A.

In one embodiment, the concept discovery module 220 purges identified potential concepts that occur too frequently or infrequently in the video metadata 117A, for some predetermined thresholds of frequency, such as a maximum threshold of 100,000 videos, and a minimum threshold of 1,500 videos. For example, the concepts "video" or "funny" are generic and so are likely to occur an extremely large number of times for very different genres of videos. Thus, they would be unlikely to represent a single, distinct type of video and would therefore be purged. Similarly, concepts occurring a very small number of times would not provide enough data to allow learning algorithms to train a useful classifier for the concepts and would likewise be purged.

The video hosting service 100 additionally comprises a feature extraction module 230 that derives features used to compactly characterize a video for purposes of machine learning. In one embodiment, the feature extraction module 230 derives a number of different audiovisual features 205 from the content of the video 117, including features relating to motion rigidity, color and texture, and audio, storing them in association with the video. Specifically, homography transformation error between feature points on two consecutive frames is employed to estimate rigidity of motion. The rigidity of motion feature generates one real number per video corresponding to the fraction of frames in the video deemed to have only rigid motion. Regarding color and textual features, a custom local descriptor collects Gabor wavelet responses at different orientations, spatial scales, and spatial offsets form the interest point; the descriptors are extracted at sparse interest points determined by a Laplacian of Gaussian feature extractor. Bag-of-words histograms are computed, and codebooks are built using hierarchical k-means. The sparse feature histogram is extracted every half second. Once the entire video is processed, the cumulative histogram is converted into a sparse code by discarding bins with less than ten activations (corresponding to five seconds). In addition, an 8×8 Hue-Saturation histogram is computed for each frame. Each bin is then interpreted as a time series. An 8-level 1D Haar wavelet decomposition is employed, and the first two moments and the extremas are computed at each level. This descriptor is then appended to the feature to form the final feature vector, which is a sparse vector of real-valued data that implicitly characterizes object shape, color, and texture along with their temporal variations. Regarding the audio features, a cochlear model of filterbanks that form a Stabilized Auditory Image (SAI) is employed. To compute the SAI a set of band-pass filters is followed by an autocorrelation of each channel, which is then transformed into a sparse code using vector quantization. The end result is a sparse vector of real-valued data that implicitly characterizes several aspects of music and speech of the audio track. Visual features can include complex, high dimensional descriptors, such as SIFT (Scale Invariant Feature Transform), GLOH (Gradient Location and Orientation Histogram), LESH (Local Energy based Shape Histogram), or SURF (Speeded Up Robust Features) features. Audio features can include a vector forming a Stabilized Auditory Image (SAI). Specifically, a set of band-pass filters is employed, followed by autocorrelation of each channel, which is then transformed into a sparse vector using vector quantization.

In one embodiment, the same set of feature types—e.g., motion rigidity, color and texture, and audio—is extracted for every video. However, different ones of these types of features can be useful for learning different types of videos. For example, the audio features are effective for learning to recognize certain types of videos primarily characterized by their music but are of little use in distinguishing videos based on their visual motion, such as distinguishing cartoon videos from other types of videos. It is appreciated that the particular types of features employed may vary in different embodiments. That is, an embodiment can employ any type of feature that usefully describes properties of videos by which one video can be distinguished from another. The extracted features 205 then serve as a representation of the associated video 117 from which they were extracted for purposes of subsequent learning operations.

Partitioning module 235 partitions the videos 117 into different sets used for performing machine learning. More specifically, the partitioning module 235 divides the videos 117 into distinct training and validation sets globally applicable to all videos, where the training set is used for learning classifiers for different concepts and the validation set is used to test the accuracy of the learned classifiers. In one embodiment in which the discovery of concepts comprises some maximum number of learning iterations, the partitioning module 235 additionally subdivides the validation set into a number of sub-partitions, one for each possible iteration.

Further, the partitioning module 235 defines, for every concept 211, a training set and validation set specifically for that concept, the members of the per-concept training set and validation set being randomly selected subsets of the global training set and validation set, respectively. The partitioning module 235 also divides the videos of the per-concept training and validation sets into "positive" examples presumed to be representative of the associated concept and "negative" examples presumed not to be representative. In one embodiment, the partitioning module 235 identifies a video as belonging to the positive set if the label 211A of the associated concept is located somewhere within its textual metadata—e.g., with each of its words in the same sequential order after the removal of stopwords and whitespace—and to the negative set otherwise. Thus, in this embodiment the positive and negative sets are defined with reference only to the user-defined metadata, without the need for manual labeling by human experts. In one embodiment, the number of negative examples that are identified is three times as many as the positive examples, with negative examples beyond that number being omitted. In short, for each concept there are four sets of videos: a training set and a validation set, each of these sets including one positive example set (textual metadata matching the concept label) and one negative example set (no textual data matching the concept label).

The classifier learning module 119 additionally comprises a classifier training module 240 that iteratively learns classifiers 211B for the concepts 211 based on the positive and negative examples identified for a concept by the partitioning module 235. More specifically, at a given iteration the classifier training module 240 attempts to learn the classifier 211B for each concept 211 by applying an ensemble learning algorithm to the derived features 205 of the videos 117 in the training set for the concept. In one embodiment, the ensemble learning algorithm employed is AdaBoost, with a number of stumps linearly proportional to the number of videos in the positive training set. Other learning algorithms, such as Linear Support Vector Machine (SVC), the details of which are known to those of skill in the art of machine learning, could likewise be used.

The classifier training module 240 evaluates the accuracy of each trained classifier 211B by applying the classifier to the videos of the validation set defined for the concept associated with the classifier, and by determining whether the resulting classification is accurate. Specifically, the classifier 211B for a concept is applied to each video in the validation set for the concept, producing some score indicating whether the video matches the associated concept.

If the score produced by the classifier is not already Boolean—directly indicating whether or not the video matches the concept—it may be mapped to a Boolean value. For example, in embodiments in which the classifiers 211B produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match. If the classifier produces a score indicating that a positive example of the training set represents the concept, the classification is considered a true positive classification (TP). Similarly, a score indicating that a video from the negative examples represents the concept is considered a false positive (FP), a score indicating that a video from the positive examples does not represent the concept is considered a false negative (FN), and a score indicating that a video from the negative examples does not represent the concept is considered a true negative (TN).

The classifier training module 240 retains a trained classifier for a given concept—that is, considers its associated concept to be recognizable—only if the scores produced by the classifier indicate sufficient accuracy. In one embodiment, the accuracy is considered sufficient only if the precision and recall of the classifier are both above predetermined values, such as 0.7, where the precision P is defined as P=TP/(TP+FP), and the recall R is defined as R=TP/(TP+FN). In another embodiment, the accuracy is considered sufficient only if an F-score is above some predetermined threshold (e.g., 0.7), where the F-score F is defined as a function of the precision and recall, F=2PR/(P+R).

As a simple example, assume that the concept discovery module 220 had identified a concept C and trained a corresponding classifier c. Then for given videos $V_1$ to $V_5$ in the validation set for C, the classifier training module 240 might produce a set of corresponding scores 0.8, 0.1, 0.35, 0.6, and 0.9. Assuming that $V_1$, $V_4$, and $V_5$ were in the positive subset of the validation set, and $V_2$ and $V_3$ were in the negative subset, and that 0.8 is the minimum score to indicate a match, the classifier training module 240 might calculate results as follows:

| Video | Score | Set | Mapped | Type |
|---|---|---|---|---|
| $V_1$ | 0.8 | Pos | 1 | TP |
| $V_2$ | 0.1 | Neg | 0 | TN |
| $V_3$ | 0.35 | Neg | 0 | TN |
| $V_4$ | 0.6 | Pos | 0 | FP |
| $V_5$ | 0.9 | Pos | 1 | TP |

That is, the score 0.8 for video $V_1$, since it is at least as large as the threshold for a match, would be mapped to 1 (indicating a match), and would represent a true positive (TP) since it came from the positive validation subset for concept C. Similarly, the score of 0.35 for video $V_3$ is less than the threshold and would thus be mapped to 0 (indicating no match), and would represent a true negative (TN) since it came from the negative validation subset for C.

The classifier learning module 119 also comprises a feature update module 245 that updates the features associated with a video 117 based on the trained classifiers 211B. Specifically, if at a given iteration the classifier training module 240 has trained classifiers for some set of concepts for which classifiers had not previously been trained (and has retained them as being sufficiently accurate), then each of these newly-trained classifiers is applied to each video 117 in the video repository. This produces a set of scores for each video, one for each newly-learned classifier. The feature update module 245 then adds these scores as new features to the existing features 205 for a video. For example, in one embodiment the feature update module 245 appends the scores to a feature vector for a video, thereby increasing the number of dimensions of the feature vector. For consistency, the order of the scores as appended to the videos 117 is consistent across the videos. Thus, the feature update module 245 effectively adds new feature information to the feature information 205 already associated with a video 117, and this information can be used to enhance classifier learning at the next iteration. Similarly, in embodiments in which an existing (retained) classifier is re-learned at a subsequent iteration, the scores associated with that re-learned classifier are substituted for the corresponding scores obtained from the existing version of the classifier and added to the features 205.

The flow of data and processing operations of the above-described modules of the classifier learning module 119 are now described.

Data Flow of Iterative Unsupervised Classifier Learning

Figure 3:
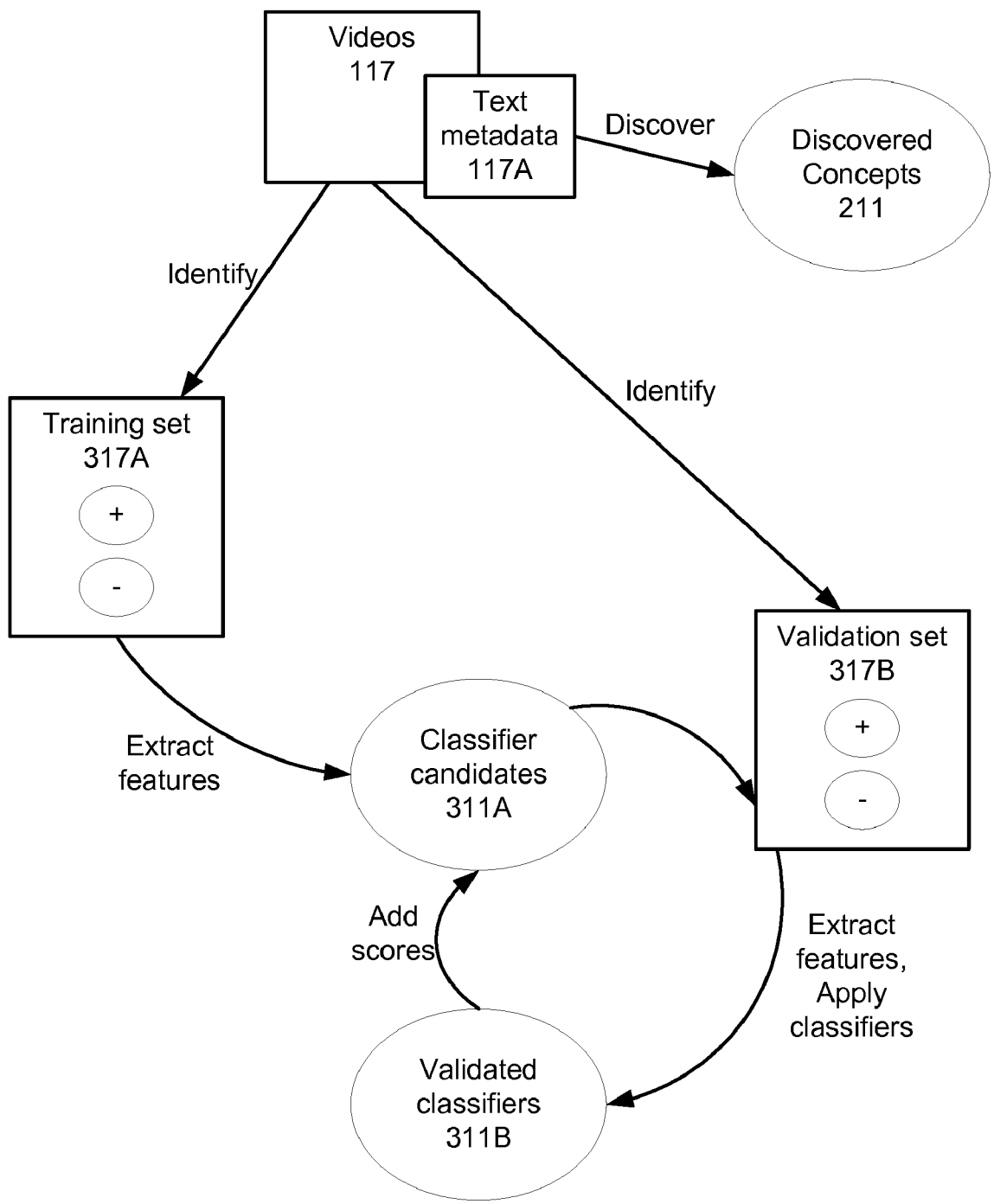
FIG. 3 is a data flow diagram representing the interactions of the various types of data analyzed and/or produced by the classifier learning module, according to one embodiment.

FIG. 3 is a data flow diagram representing the interactions of the various types of data analyzed and/or produced by the classifier learning module 119, according to one embodiment.

Given the videos 117 and their associated textual metadata 117A, the concept discovery module 220 discovers the set of concepts 211 by extracting n-grams (concepts) from the metadata. Further, the partitioning module 235 identifies, for each of the discovered concepts 211, a training set 317A and a validation set 317B that are subsets of the videos 117, as well as establishing a positive and a negative set of examples from within each.

The feature extraction module 230 extracts features from the training set 317A, and at each iteration the classifier training module 240 uses these features to train a classifier candidate 311A for each of the discovered concepts 211. Similarly, the feature extraction module 230 extracts features from the validation set 317B, and at each iteration the classifier training module 240 applies the classifier candidates 311A to these features to obtain a set of scores. The classifier training module 240 uses these scores to identify a set of validated classifiers 311B that are sufficiently accurate in recognizing whether or not videos represent the concepts associated with the classifiers. The feature update module 245 then adds the scores generated by the newly validated classifiers 311B to the features already associated with the videos in the training set 317A and the validation set 317B. Using these new scores, in addition to the features extracted from the training set 317A and any scores from prior iterations, the classifier training module 240 trains new classifier candidates 311A in the next iteration.

Figure 4A:
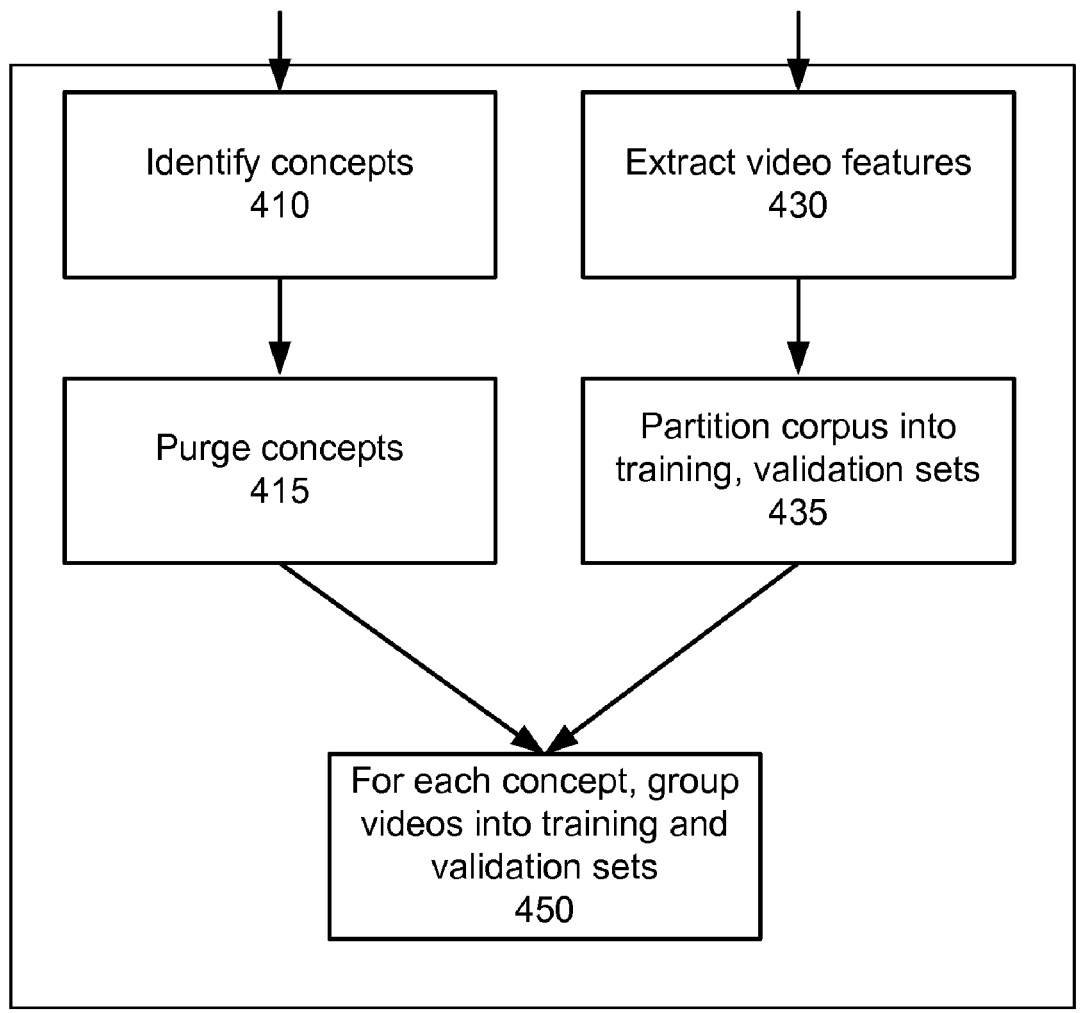
FIG. 4A is a flowchart illustrating data preparation operations performed by the classifier learning module preparatory to performing training, according to one embodiment.
Figure 4B:
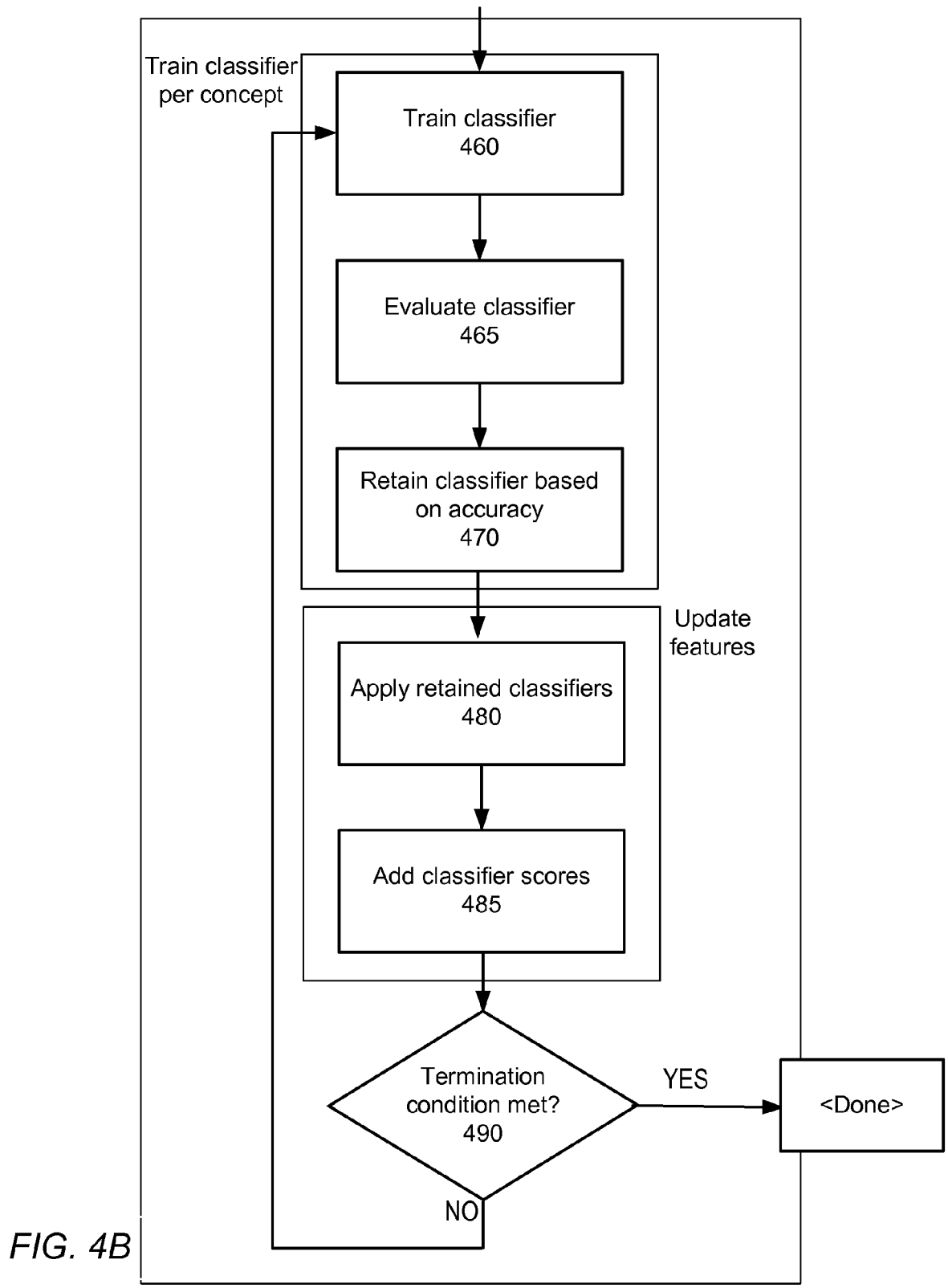
FIG. 4B is a flowchart illustrating classifier learning operations performed by the classifier learning module based on the prepared data, according to one embodiment.

The operations of the various sub-modules of the classifier learning module 119 are now alternatively illustrated using the flowcharts of FIGS. 4A-4B.

Process of Iterative Unsupervised Classifier Learning

FIG. 4A is a flowchart illustrating in more detail the data preparation operations performed by the classifier learning module 119 preparatory to performing training, according to one embodiment. Data preparation broadly comprises obtaining concepts from video metadata 117A and processing and partitioning the videos 117 to produce the input data from which classifiers are learned.

Concepts are identified 410 within the metadata 117A of the various videos 117 by identifying the various n-grams in the metadata. The concepts less likely to be useful, such as concepts occurring very frequently or very infrequently, are purged 415. These operations are described above in more detail with respect to the concept discovery module 220, above. The result is the set of concept labels 211A of FIG. 2, each label representing a concept. A concept label 211A will be an n-gram, varying from a uni-gram to the maximum of value N (e.g., N=4 for a four-gram).

Independently of the concept discovery, features are extracted 430 from each the videos 117, as described above with respect to the feature extraction module 230. As noted, the features can be of different types that characterize the video according to different classes of properties, such as features characterizing the motion, color and/or texture, and audio properties of a video. The features 205 are then associated with the video 117 from which they were derived. Features 205 can be represented by high dimensional feature vectors. Dimensionality reduction methods (e.g., principal component analysis, locality sensitivity hashing) may also be used to reduce the vectors to a more compact representation making for more efficient processing.

The videos 117 of the video corpus 105 (or more specifically, the feature vectors 205 that represent them) are partitioned 435 into training and validation sets, as described above with respect to the partitioning module 235. In one embodiment, this results in one global training set and one global validation set, the validation set being further subdivided into M disjoint subsets for some integer M, one for each of the possible iterations.

For each of the concepts discovered as a result of steps 410-415, the videos 117 are further grouped 450 into training and validation sets, as further described above with respect to the partitioning module 235. Further, positive and negative video examples are identified for each concept based on whether the concept label 211A appears in the metadata 205 of the various videos.

Using the resulting per-concept training and validation sets (including the positive and negative examples) and the per-video derived features, classifier learning can then take place.

FIG. 4B is a flowchart illustrating classifier learning operations performed by the classifier learning module 119 based on this prepared data, according to one embodiment. Initially, none of the concepts 211 has a trained classifier 211B (i.e., all classifiers start out in an initialized condition), and the features 205 of the videos 117 include only the features initially identified by the feature extraction module 230 before the learning process began. The learning operations of FIG. 4B proceed to learn classifiers iteratively, with the classifiers learned in one iteration providing additional features (i.e., scores) that are useful for training the remaining untrained classifiers in the next iteration. The added information of the classifier scores thus permits training the remaining classifiers for additional concepts that could not be reliably learned at prior iterations, thus allowing gradual learning of more complex concepts (e.g., of abstract concepts).

More specifically, in a given iteration classifiers are trained 460 based on the training set of features 205 previously associated with their corresponding concepts—i.e., the features extracted from the various concept training sets—using a learning algorithm such as AdaBoost. This training process is further described above with respect to the classifier training module 240. The accuracy of each trained classifier is then evaluated 465 using the validation sets previously associated with the corresponding concept for the classifier. That is, the scores produced by the trained classifiers indicate whether or not the video from which the score was derived represents the given category. The values of the scores, and the source of the videos from which the scores were derived (i.e., the positive or negative example sets), are used to determine estimated accuracies of their classifiers. For example, a score indicating that a video from the positive example set for a concept does represent that concept tends to show that the classifier producing the score is accurate, but if the video were from the negative example set, the same score would tend to show that the classifier is not accurate. Classifiers found to have sufficient accuracy are retained 470 as classifiers 211B for their corresponding concepts, and classifiers found to lack sufficient accuracy are discarded (e.g., not marked as representing an accurate classifier). Thus, at the end of an iteration, some of the concepts 211 will have an associated retained classifier 211B deemed to be sufficiently accurate, and some will not.

The retained classifiers are applied 480 to each of the videos 117 in the training or validation sets for any of the concepts 211 (or, more specifically, to the features 205 of the respective videos). This produces a set of scores for each video, one score per trained classifier. These scores are then added 485 (e.g., appended) to the existing features 205 for the videos and used in the learning at the next iteration.

At the end of each iteration, it is determined 490 whether a termination condition has been met, in which case the learning process terminates. At time of termination, the concepts that can be recognized are those for which a classifier was retained in the prior iterations as being sufficiently accurate. The remaining concepts lacking a classifier are unrecognizable—or (more specifically), not recognizable with the required threshold degree of accuracy. If no termination condition has been met, the learning process continues to the next iteration, returning to training step 460 and using the score features derived from the classifiers trained (or re-trained) during the prior iteration to learn additional classifiers. In one embodiment, a termination condition is met if some predetermined maximum number of iterations (e.g., 100) has occurred, and/or if no additional new concepts, or fewer than some threshold desired number of new concepts, were learned in the prior iteration.

The additional video features provided by the new classifier scores at a given iteration can be used in various ways to learn classifiers in the next iteration. In one embodiment, additional classifiers for concepts not already having a classifier are trained using the additional features, but the previously-trained classifiers are not retrained. In another embodiment, the previously-trained classifiers are retrained using the additional score features, thereby tending to become more accurate, but classifiers are not trained for new concepts. In another embodiment, classifiers are trained for new concepts, and previously-learned classifiers are also retrained using the additional score features.

Note that constraints on the learning process permit accurate learning of classifiers based only on the scarce or potentially-inaccurate user-supplied metadata. Specifically, the purging of concepts that are too frequent or too infrequent, the evaluation of the trained classifiers on a previously unseen validation set after every iteration, and a requirement of high classifier accuracy (e.g., both high precision and high recall) work together to ensure that the inaccuracies of the user-supplied metadata are properly taken into account.

Thus, by above-described process performed by the classifier learning module 119 learns concepts that can be accurately recognized in a set of videos, as well as the classifiers used to recognize them. Moreover, the process operates without the need for any set of concepts to be known a priori, and without the need for human experts to pre-apply or verify concept labels to the various videos.

Applications of Iterative Unsupervised Classifier Learning

The above-described process, and the classifiers obtained therefrom, have a number of valuable applications.

Figure 5:
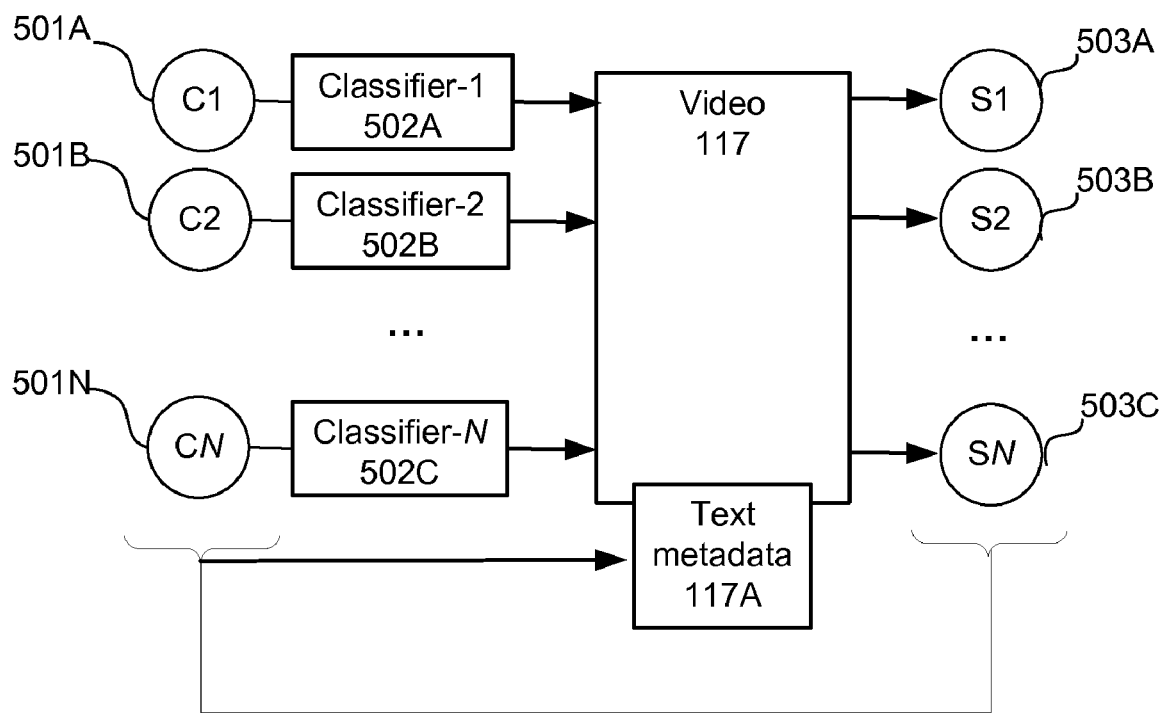
FIG. 5 is a data flow diagram depicting the use of the learned classifiers to augment metadata of a video, according to one embodiment.

1) Concept Labeling of Videos: As one example, the process can be used to add concept labels to videos having little or no user-supplied descriptive text. That is, the set of learned concept classifiers can be applied to each video 117 of the video repository 116. Then, in one embodiment, for each classifier 211B whose resulting score indicates that the video 117 represents the associated concept 211, the corresponding concept label 211A is added to the metadata of the video. For example, FIG. 5 depicts classifiers 502, each corresponding to a concept 501. The classifiers 502 are applied to one of the videos 117, each producing some score 503. For the scores 503 that indicate that the video 117 represents the associated concept 501, the labels 211A of the corresponding concepts 501 are then added to the text metadata 117A of the video. In an alternative embodiment, the scores 503 are sorted, and only the labels 211A corresponding to the top N concepts 211 are added. In another alternative embodiment, only those scores 503 indicating a particularly strong match—i.e., only those scores above some particularly high threshold—are added.

2) Concept Representation for Video Browsing and Searching: Since, as previously noted, users frequently provide only very minimal textual description when uploading a video to a video hosting site, this additional information can prove extremely useful to users when searching for videos of relevance to them. For example, the user can perform an explicit query for videos, such as searching for videos having a particular concept 211, and the additional concept information derived for the various videos using the retained classifiers 211B can help to identify videos representative of the concept. Similarly, a video hosting service using the concept data produced by the classifier learning module 119 could display some form of visual representation of the learned concepts, such as a hyperlink, a graphic, or a labeled option button, in a category-browsing user interface, e.g., on a web page associated with the video hosting site. A user could then click on a visual representation of the concept to see videos previously determined to represent that concept. To provide rapid user feedback, a video hosting service could periodically identify and cache the videos with the N highest scores for a given concept and then quickly display those videos in response to a user clicking on the visual indication corresponding to that concept. Or, the video hosting site could display the discovered concepts found to be associated with a given video and added to the video metadata in its standard user interface, and a user could scan the metadata associated with a currently-displayed video to determine whether it is worth viewing further.

3) Correction of Video Descriptions Based on Concept Identification: As another example application of the process, existing user-supplied textual metadata can be tested and—if found to be inaccurate—modified. This is of particular use for identifying and fixing "spam" video descriptions, where the user submitting the video intentionally provided a misleading description. More specifically, the user-supplied textual metadata for a video 117 is obtained. If the textual metadata includes a concept label 211A for which a classifier 211B has been learned, the classifier is applied to the video, thereby producing a score. If the score indicates that the video does not represent the associated concept—e.g., the score is below some minimum threshold—then a remedial action can be taken, such as flagging the video, removing the associated text from the user-supplied metadata, and the like.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for learning concepts applicable to videos, the method comprising:
    storing a set of concepts derived from textual metadata of a plurality of videos;
    initializing a set of candidate classifiers, each candidate classifier associated with one of the concepts;
    extracting features from the plurality of videos, including a set of training features from a training set of the videos and a set of validation features from a validation set of the videos;
    learning accurate classifiers for the concepts by iteratively performing the steps of:
        training the candidate classifiers based at least in part on the set of training features;
        determining which of the trained candidate classifiers accurately classify videos, based at least in part on application of the trained candidate classifiers to the set of validation features;
        applying the candidate classifiers determined to be accurate to ones of the features, thereby obtaining a set of scores, and
        adding the set of scores to the set of training features; and
    storing the candidate classifiers determined to be accurate.

2. The computer-implemented method of claim 1, further comprising:
    identifying, in a first iteration of the training; a trained classifier determined not to be accurate;
    retraining the trained classifier in a next iteration of the training, based at least in part on the added set of scores; and determining that the retrained classifier accurately classifies videos.

3. The computer-implemented method of claim 1, further comprising:
identifying, in a first iteration of the training, a trained classifier determined to be accurate;
retraining the trained classifier in a next iteration of the training, based at least in part on the added set of scores; and
determining that the retrained classifier is more accurate than the trained classifier before the retraining.

4. The computer-implemented method of claim 1, wherein the concepts are n-grams consisting of at most n words sequentially ordered within the textual metadata.

5. The computer-implemented method of claim 1
wherein the validation set of features comprises, for each of the concepts, a set of positive training features extracted from videos having the concept within their textual metadata, and a set of negative training features extracted from videos lacking the concept within their textual metadata; and
wherein determining which of the trained candidate classifiers accurately classify videos comprises:
obtaining validation scores from the application of the trained candidate classifiers to the set of validation features; and
for a first one of the validation scores produced by applying a first one of the candidate classifiers to a first set of the features extracted from a first one of the videos, wherein the first one of the candidate classifiers corresponds to a first one of the concepts:
determining whether the first video represents the first concept, based at least in part on the first validation score, and
determining whether the first set of the features belongs to the positive training features or to the negative training features.

6. The computer-implemented method of claim 1, further comprising:
for a first one of the stored classifiers corresponding to a first one of the stored concepts:
identifying, within textual metadata of a video, text corresponding to the first concept;
identifying, within the added set of scores, a score obtained by applying the first one of the stored classifiers to the video; and
responsive to the score indicating that the video does not represent the first concept, modifying the textual metadata.

7. The computer-implemented method of claim 6, wherein modifying the textual metadata comprises removing the text corresponding to the first concept from the textual metadata.

8. The computer-implemented method of claim 1, further comprising:
for a first one of the stored classifiers corresponding to a first one of the stored concepts:
identifying, within the added set of scores, a score obtained from applying the first one of the stored classifiers to a first video; and
responsive to the score indicating that the video represents the first concept, adding text corresponding to the first concept to the textual metadata.

9. The computer-implemented method of claim 1, wherein training the candidate classifiers comprises applying an ensemble learning classifier to the training set of features.

10. The computer-implemented method of claim 1, wherein none of the plurality of videos has, within textual metadata of the video, a training label from a predefined set of training concepts, the training label manually applied by a human expert.

11. A non-transitory computer-readable storage medium having executable computer program instructions embodied therein for learning concepts applicable to videos, actions of the computer program instructions comprising:
storing a set of concepts derived from textual metadata of a plurality of videos;
initializing a set of candidate classifiers, each candidate classifier associated with one of the concepts;
extracting features from the plurality of videos, including a set of training features from a training set of the videos and a set of validation features from a validation set of the videos;
learning accurate classifiers for the concepts by iteratively performing the steps of:
training the candidate classifiers based at least in part on the set of training features;
determining which of the trained candidate classifiers accurately classify videos, based at least in part on application of the trained candidate classifiers to the set of validation features;
applying the candidate classifiers determined to be accurate to ones of the features, thereby obtaining a set of scores, and
adding the set of scores to the set of training features; and
storing the candidate classifiers determined to be accurate.

12. The non-transitory computer-readable storage medium of claim 11, the actions of the instructions further comprising:
identifying, in a first iteration of the training, a trained classifier determined not to be accurate;
retraining the trained classifier in a next iteration of the training, based at least in part on the added set of scores; and
determining that the retrained classifier accurately classifies videos.

13. The non-transitory computer-readable storage medium of claim 11:
wherein the validation set of features comprises, for each of the concepts, a set of positive training features extracted from videos having the concept within their textual metadata, and a set of negative training features extracted from videos lacking the concept within their textual metadata; and
wherein determining which of the trained candidate classifiers accurately classify videos comprises:
obtaining validation scores from the application of the trained candidate classifiers to the set of validation features; and
for a first one of the validation scores produced by applying a first one of the candidate classifiers to a first set of the features extracted from a first one of the videos, wherein the first one of the candidate classifiers corresponds to a first one of the concepts:
determining whether the first video represents the first concept, based at least in part on the first validation score, and
determining whether the first set of the features belongs to the positive training features or to the negative training features.

14. The non-transitory computer-readable storage medium of claim 11, further comprising:
for a first one of the stored classifiers corresponding to a first one of the stored concepts:
identifying, within the added set of scores, a score obtained from applying the first one of the stored classifiers to a first video; and
responsive to the score indicating that the video represents the first concept, adding text corresponding to the first concept to the textual metadata.

15. A computer system for learning concepts applicable to videos, the system comprising:
a computer processor; and
a computer program executable by the computer processor and performing actions comprising:
storing a set of concepts derived from textual metadata of a plurality of videos;
initializing a set of candidate classifiers, each candidate classifier associated with one of the concepts;
extracting features from the plurality of videos, including a set of training features from a training set of the videos and a set of validation features from a validation set of the videos;
learning accurate classifiers for the concepts by iteratively performing the steps of:
training the candidate classifiers based at least in part on the set of training features;
determining which of the trained candidate classifiers accurately classify videos, based at least in part on application of the trained candidate classifiers to the set of validation features;
applying the candidate classifiers determined to be accurate to ones of the features, thereby obtaining a set of scores, and
adding the set of scores to the set of training features; and
storing the candidate classifiers determined to be accurate.

16. The computer system of claim 15, the actions further comprising:
identifying, in a first iteration of the training, a trained classifier determined not to be accurate;
retraining the trained classifier in a next iteration of the training, based at least in part on the added set of scores; and
determining that the retrained classifier accurately classifies videos.

17. The computer system of claim 15, wherein the concepts are n-grams consisting of at most n words sequentially ordered within the textual metadata.

18. A computer-implemented method for learning concepts applicable to videos, the method comprising:
extracting a set of concepts from textual metadata of a plurality of videos;
initializing a set of candidate classifiers, each candidate classifier associated with one of the concepts;
extracting a feature vector from each of the plurality of videos, including a set of training feature vectors from a training set of the videos and a set of validation feature vectors from a validation set of the videos;
learning accurate classifiers for the concepts by iteratively performing the steps of:
training the candidate classifiers based at least in part on the validation feature vectors;
determining which of the trained candidate classifiers accurately classify videos and which of the trained candidate classifiers do not accurately classify videos, based at least in part on application of the trained candidate classifiers to the validation feature vectors;
applying the candidate classifiers determined to be accurate to ones of the feature vectors, thereby obtaining a set of scores for each of the ones of the feature vectors;
for each of the ones of the feature vectors, adding the corresponding set of scores to the feature vector, thereby obtaining an augmented feature vector; and
for one of the candidate classifiers determined not to accurately classify videos:
retraining the candidate classifier in a later iteration based at least in part on ones of the augmented feature vectors, and
determining that the retrained candidate classifier accurately classifies videos;
storing the candidate classifiers determined to be accurate in association with their associated concepts; and
storing the augmented feature vectors in association with the videos from which they were originally extracted.

19. The computer-implemented method of claim 18, wherein the concepts are n-grams consisting of at most n words sequentially ordered within the textual metadata.

20. The computer-implemented method of claim 18, wherein:
the set of validation feature vectors comprises, for each of the concepts, a set of positive training feature vectors extracted from videos having the concept within their textual metadata, and a set of negative training feature vectors extracted from videos lacking the concept within their textual metadata; and
determining which of the trained candidate classifiers accurately classify videos comprises:
obtaining validation scores from the application of the trained candidate classifiers to the set of validation feature vectors; and
for a first one of the validation scores produced by applying a first one of the candidate classifiers to a first feature vector extracted from a first one of the videos, the first one of the candidate classifiers corresponding to a first one of the concepts:
determining whether the first video represents the first concept, based at least in part on the first validation score, and
determining whether the first feature vector belongs to the positive training feature vectors or to the negative training feature vectors.

* * * * *

UNITED STATES PATENT AND TRADEMARK OFFICE
CERTIFICATE OF CORRECTION

PATENT NO. : 8,396,286 B1
APPLICATION NO. : 12/822727
DATED : March 12, 2013
INVENTOR(S) : Hrishikesh Balkrishna Aradhye et al.

Page 1 of 1

It is certified that error appears in the above-identified patent and that said Letters Patent is hereby corrected as shown below:

In the Claims:

Column 14, line 63, after "iteration of the" delete "training;" and insert -- training, --.

Signed and Sealed this
Sixth Day of August, 2013

Teresa Stanek Rea
*Acting Director of the United States Patent and Trademark Office*